(12) United States Patent
Schmitz et al.

(10) Patent No.: US 10,830,543 B2
(45) Date of Patent: Nov. 10, 2020

(54) ADDITIVELY MANUFACTURED DUCTED HEAT EXCHANGER SYSTEM WITH ADDITIVELY MANUFACTURED HEADER

(71) Applicant: UNITED TECHNOLOGIES CORPORATION, Hartford, CT (US)

(72) Inventors: John T Schmitz, West Hartford, CT (US); Neal R Herring, East Hampton, CT (US); John H Whiton, South Windsor, CT (US); Joseph Turney, Amston, CT (US); Brian St. Rock, Andover, CT (US); Michael K Ikeda, West Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 555 days.

(21) Appl. No.: 14/615,732

(22) Filed: Feb. 6, 2015

(65) Prior Publication Data

US 2016/0231068 A1  Aug. 11, 2016

(51) Int. Cl.
| | | |
|---|---|---|
| *F28F 9/02* | (2006.01) |
| *B23P 15/26* | (2006.01) |
| *F28D 21/00* | (2006.01) |
| *B33Y 80/00* | (2015.01) |

(52) U.S. Cl.
CPC .............. *F28F 9/026* (2013.01); *B23P 15/26* (2013.01); *F28F 9/02* (2013.01); *F28F 9/0265* (2013.01); *B33Y 80/00* (2014.12); *F28D 2021/0021* (2013.01); *F28D 2021/0026* (2013.01); *F28F 2255/18* (2013.01)

(58) Field of Classification Search
CPC ..... F28F 9/0263; F28F 9/0268; F28F 2255/00
USPC ........................................................ 165/174
See application file for complete search history.

(56) References Cited

U.S. PATENT DOCUMENTS

| | | | | |
|---|---|---|---|---|
| 2,768,814 A | * | 10/1956 | Frey et al. ................ | F28D 9/00 138/37 |
| 3,364,548 A | * | 1/1968 | Marco .................. | B21D 53/085 165/166 |
| 4,474,001 A | * | 10/1984 | Griffin et al. ............. | F02C 7/16 60/204 |
| 4,678,025 A | * | 7/1987 | Oberlander et al. .... | F24F 1/022 165/48.1 |
| 5,269,133 A | | 12/1993 | Wallace | |

(Continued)

FOREIGN PATENT DOCUMENTS

| | | |
|---|---|---|
| EP | 2 636 982 | 9/2013 |
| EP | 2 811 249 | 12/2014 |

(Continued)

OTHER PUBLICATIONS

European search report for Application No. 16154528.0-1602 dated Jun. 22, 2016.

*Primary Examiner* — Ljiljana V. Ciric
(74) *Attorney, Agent, or Firm* — Bachman & LaPointe, P.C.

(57) ABSTRACT

A heat exchanger system includes an additively manufactured inlet header upstream of, and in fluid communication with, the heat exchanger core and an additively manufactured exit header downstream of, and in fluid communication with, the heat exchanger core. A method of manufacturing a header for a ducted heat exchanger system for a gas turbine engine includes additively manufacturing a header with respect to a desired airflow therethrough.

12 Claims, 5 Drawing Sheets

(56) References Cited

U.S. PATENT DOCUMENTS

| | | | |
|---|---|---|---|
| 5,269,135 | A | 12/1993 | Vermejan et al. |
| 6,058,696 | A | 5/2000 | Nikkanen et al. |
| 6,106,229 | A | 8/2000 | Nikkanen et al. |
| 6,443,352 | B1 * | 9/2002 | White ................ B23K 11/0013 219/83 |
| 6,698,687 | B2 | 3/2004 | Daggett |
| 7,398,641 | B2 | 7/2008 | Stretton et al. |
| 7,631,485 | B2 | 12/2009 | Suciu et al. |
| 7,810,312 | B2 | 10/2010 | Stretton et al. |
| 7,810,552 | B2 | 10/2010 | Slaughter |
| 7,866,372 | B2 | 1/2011 | Slaughter |
| 7,866,377 | B2 | 1/2011 | Slaughter |
| 7,971,438 | B2 | 7/2011 | Taylor et al. |
| 7,997,062 | B2 | 8/2011 | Sun et al. |
| 8,181,443 | B2 | 5/2012 | Rago et al. |
| 8,661,783 | B2 | 3/2014 | Foster et al. |
| 8,726,976 | B2 | 5/2014 | Schrader et al. |
| 8,784,047 | B2 | 7/2014 | Elder et al. |
| 9,200,855 | B2 * | 12/2015 | Kington ................ F28F 9/0263 |
| 10,670,349 | B2 * | 6/2020 | Wilson ................ F28F 9/0214 |
| 10,718,222 | B2 * | 7/2020 | King ................ B22F 5/009 |
| 2003/0111209 | A1 * | 6/2003 | Tsujita et al. ......... F28D 7/1653 165/51 |
| 2006/0207757 | A1 * | 9/2006 | Danielsson et al. .. F28D 7/1638 165/159 |
| 2009/0211743 | A1 | 8/2009 | Schrader et al. |
| 2010/0199955 | A1 * | 8/2010 | Smith ................ F02B 29/0456 123/542 |
| 2011/0180236 | A1 * | 7/2011 | Krasnov ................ F28F 9/0263 165/104.19 |
| 2013/0199288 | A1 * | 8/2013 | Goenka ................ F15D 1/001 73/202 |
| 2013/0236299 | A1 * | 9/2013 | Kington ................ F28F 9/0263 415/177 |
| 2014/0326197 | A1 * | 11/2014 | Deivasigamani et al. ................ F24H 1/145 122/18.4 |
| 2014/0360698 | A1 | 12/2014 | Waldman et al. |
| 2016/0003552 | A1 | 1/2016 | Chordia et al. |
| 2016/0231068 | A1 * | 8/2016 | Schmitz ................ B23P 15/26 |
| 2017/0089643 | A1 * | 3/2017 | Arafat ................ F28D 9/0093 |
| 2017/0114667 | A1 * | 4/2017 | Sabo ................ F02C 3/04 |
| 2019/0024988 | A1 * | 1/2019 | Wilson ................ F28F 9/0214 |
| 2019/0024989 | A1 * | 1/2019 | Wilson ................ F28F 9/0243 |
| 2019/0154345 | A1 * | 5/2019 | Martinez ................ F28F 9/0268 |
| 2020/0248571 | A1 * | 8/2020 | King ................ F04D 29/444 |

FOREIGN PATENT DOCUMENTS

| | | |
|---|---|---|
| WO | 2009105454 | 8/2009 |
| WO | 2014152239 | 9/2014 |
| WO | 2014200588 | 12/2014 |

\* cited by examiner

ADDITIVELY MANUFACTURED DUCTED HEAT EXCHANGER SYSTEM WITH ADDITIVELY MANUFACTURED HEADER

BACKGROUND

The present disclosure relates to heat exchangers and, more particularly, to an additive manufactured heat exchanger header.

Gas turbine engines, such as those that power modern commercial and military aircraft, typically include a ducted heat exchanger system with a heat exchanger and associated equipment to exchange engine heat with airflow. The gas turbine engine architecture typically dictates the ducted heat exchanger placement within a nacelle that encloses the engine.

Conventional heat exchanger cores, have uniform internal and external geometries due in part to the complexity of manufacture. Although effective, the heat exchanger may be subject to local stress concentrations or other structural requirements that drive increases in thickness or material changes for the entire heat exchanger. This may result in increased weight and cost. The heat exchanger is also typically constructed of dissimilar metals that expand at differing rates when exposed to varying thermal boundary conditions typical of a gas turbine engine environment that may further limit the life of the heat exchanger.

Ducted heat exchangers also utilize an inlet flow guide and an exit flow guide within the nacelle that is aerodynamically contoured to distribute the air onto the heat exchanger. Manufacturing techniques utilized for these surfaces may not always be conducive to an optimized aerodynamic geometry and may impact ideal nacelle aerodynamic design. This may result in an engine performance debit.

SUMMARY

A heat exchanger system according to one disclosed non-limiting embodiment of the present disclosure includes an additively manufactured header in fluid communication with a heat exchanger core.

A further embodiment of the present disclosure includes, wherein the additively manufactured header is an inlet header.

A further embodiment of any of the foregoing embodiments of the present disclosure includes, wherein the additively manufactured header is an exit header.

A further embodiment of any of the foregoing embodiments of the present disclosure includes, wherein the additively manufactured header is non-symmetrical.

A further embodiment of any of the foregoing embodiments of the present disclosure includes, wherein the additively manufactured header is shaped to provide a uniform velocity of airflow along an inlet face of the core.

A further embodiment of any of the foregoing embodiments of the present disclosure includes, wherein the additively manufactured header is an inlet header.

A further embodiment of any of the foregoing embodiments of the present disclosure includes, wherein the additively manufactured header is shaped to provide a uniform velocity of airflow from an exit face of the core.

A further embodiment of any of the foregoing embodiments of the present disclosure includes, wherein the additively manufactured header is an exit header.

A further embodiment of any of the foregoing embodiments of the present disclosure includes, wherein the additively manufactured header is contoured such that an airflow that enters the core is generally perpendicular to the front face over the entirety of the front face.

A further embodiment of any of the foregoing embodiments of the present disclosure includes, wherein the additively manufactured header is shaped to provide a non-uniform velocity to minimize thermal stresses.

A heat exchanger system according to another disclosed non-limiting embodiment of the present disclosure includes a heat exchanger core; an additively manufactured inlet header upstream of, and in fluid communication with, the heat exchanger core; and an additively manufactured exit header downstream of, and in fluid communication with, the heat exchanger core.

A further embodiment of any of the foregoing embodiments of the present disclosure includes, wherein the additively manufactured heat exchanger core provides an about 15-20% reduction in a volume as compared to an equivalent thermal capacity brick shaped heat exchanger due to the additively manufactured inlet header and the additively manufactured exit header.

A further embodiment of any of the foregoing embodiments of the present disclosure includes, wherein the additively manufactured inlet header is shaped to provide a uniform velocity of airflow along an inlet face of the core.

A further embodiment of any of the foregoing embodiments of the present disclosure includes, wherein the additively manufactured header is shaped to provide a non-uniform velocity to minimize thermal stresses.

A further embodiment of any of the foregoing embodiments of the present disclosure includes, wherein the additively manufactured exit header is shaped to provide a uniform velocity of airflow along an inlet face of the core.

A further embodiment of any of the foregoing embodiments of the present disclosure includes a multiple of additively manufactured internal splitters within the additively manufactured header.

A further embodiment of any of the foregoing embodiments of the present disclosure includes, wherein the additively manufactured inlet header and the additively manufactured inlet header are shaped to respectively provide a uniform velocity of airflow into and from the core.

A method of manufacturing a header for a heat exchanger system according to another disclosed non-limiting embodiment of the present disclosure includes additively manufacturing a header with respect a desired airflow therethrough.

A further embodiment of any of the foregoing embodiments of the present disclosure includes, wherein the header is additively manufactured to provide a non-uniform velocity to minimize thermal stresses.

A further embodiment of any of the foregoing embodiments of the present disclosure includes, wherein the header is additively manufactured to provide a uniform velocity of airflow into a core along an entire face of the core.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The components in the drawings are not necessarily to scale. Moreover, in the drawings, like reference numerals designate corresponding parts throughout the several views. The drawings that accompany the detailed description can be briefly described as follows.

DETAILED DESCRIPTION

Figure 1:
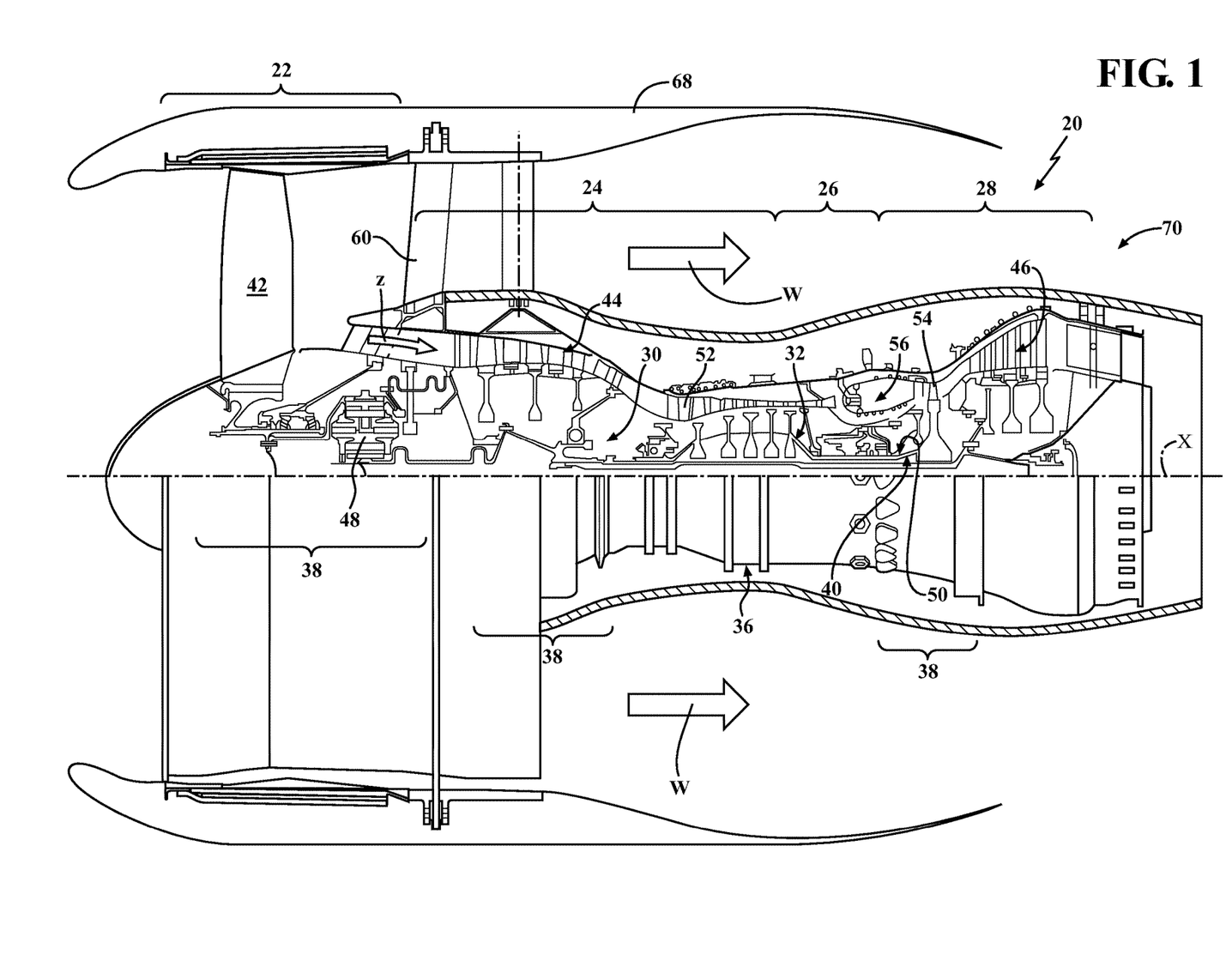
FIG. 1 is a schematic cross-section of an example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. The fan section 22 drives bypass air along a bypass flowpath and into the compressor section 24. The compressor section 24 drives air along a core flowpath for compression of a core airflow and communication into the combustor section 26, which then expands and directs the air through the turbine section 28. Although depicted as a turbofan in the disclosed non-limiting embodiment, it should be understood that the concepts described herein are not limited to use with turbofans as the teachings may be applied to other types of turbine engines such as a turbojets, turboshafts, and three-spool engine architectures.

The engine 20 generally includes a low spool 30 and a high spool 32 mounted for rotation about an engine central longitudinal axis relative to an engine case structure 36. The low spool 30 generally includes an inner shaft 40 that interconnects a fan 42, a low pressure compressor ("LPC") 44, and a low pressure turbine ("LPT") 46. The inner shaft 40 drives the fan 42 directly or through a geared architecture 48 to drive the fan 42 at a lower speed than the low spool 30. An example reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the HPC 52 and the HPT 54. The inner shaft 40 and the outer shaft 50 are concentric, and rotate about the engine central longitudinal axis.

Core airflow is compressed by the LPC 44, then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion. The main engine shafts 40, 50 are supported at a plurality of points by bearing systems 38 within the case structure 36.

Figure 2:
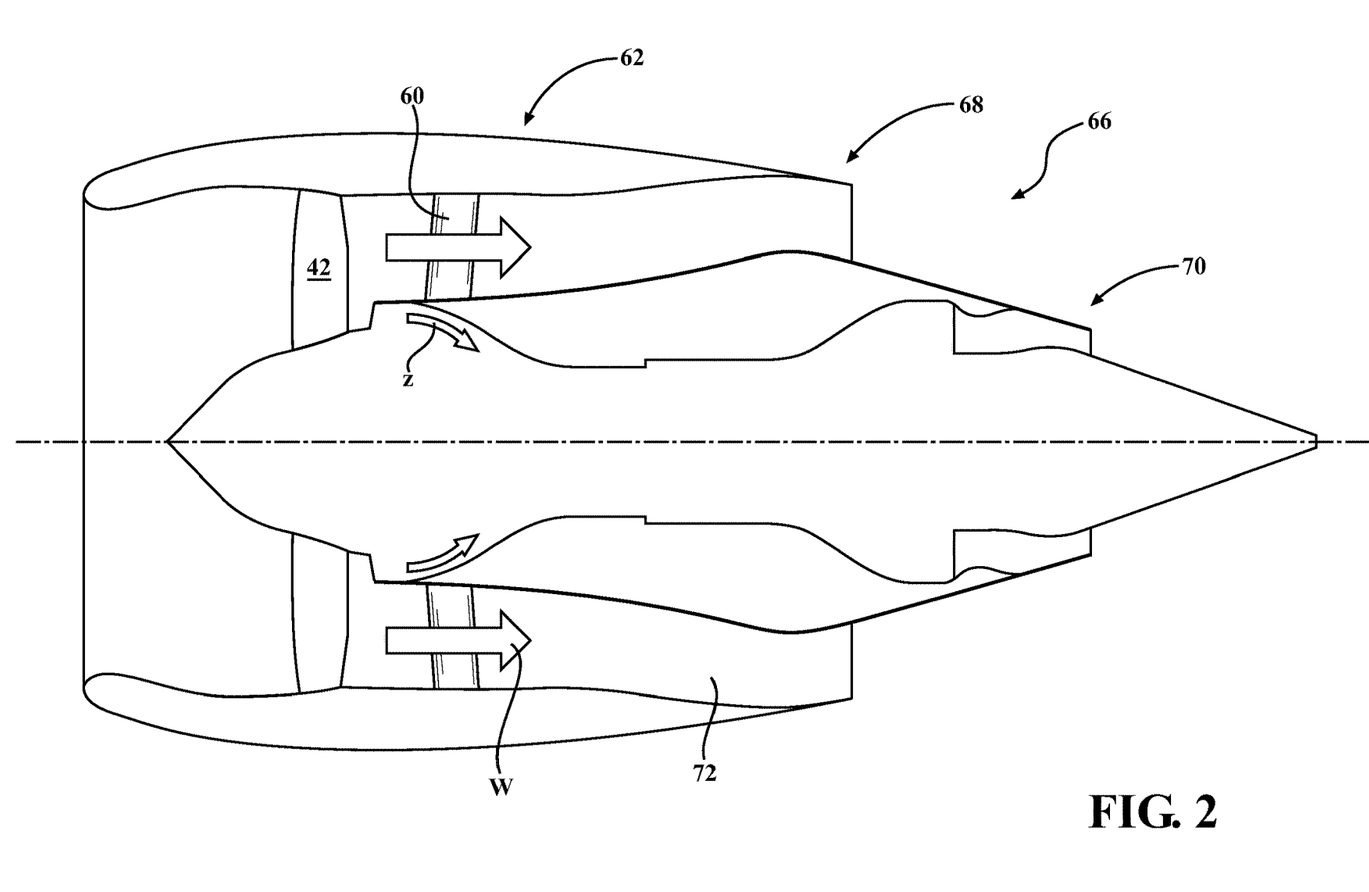
FIG. 2 is a schematic view of a nacelle assembly with a multiple of example locations for a ducted heat exchanger system that exchange flows with a common air stream.

With reference to FIG. 2, the fan 42 drives air along a fan bypass flowpath "W" past a Fan Exit Guide Vane system 60.

A ducted heat exchanger system 62 includes a heat exchanger 64 that may be at least partially integrated into a nacelle assembly 66 such as a fan nacelle 68, a core nacelle 70, a bifurcation 72, the Fan Exit Guide Vane system 60 or any combination thereof. It should be appreciated that although a nacelle assembly 66 will be utilized in the illustrated embodiment, various other environments may also be used to contain the ducted heat exchanger system 62.

The ducted heat exchanger system 62 positions the heat exchanger 64 between an inlet duct 82 and an exit duct 84 that are both in fluid communication with the same air stream. For example, the inlet duct 82 and the exit duct 84 may be located within the fan nacelle 68 for communication with a free stream airflow (illustrated schematically as position A); within the fan nacelle 68 for communication with a bypass stream airflow (illustrated schematically as position B); within the core nacelle 70 for communication with the bypass stream airflow (illustrated schematically as position C); and/or with the core engine (illustrated schematically as position D). It should be appreciated that various positions and flow paths may be alternatively, or additionally, provided.

Figure 3:
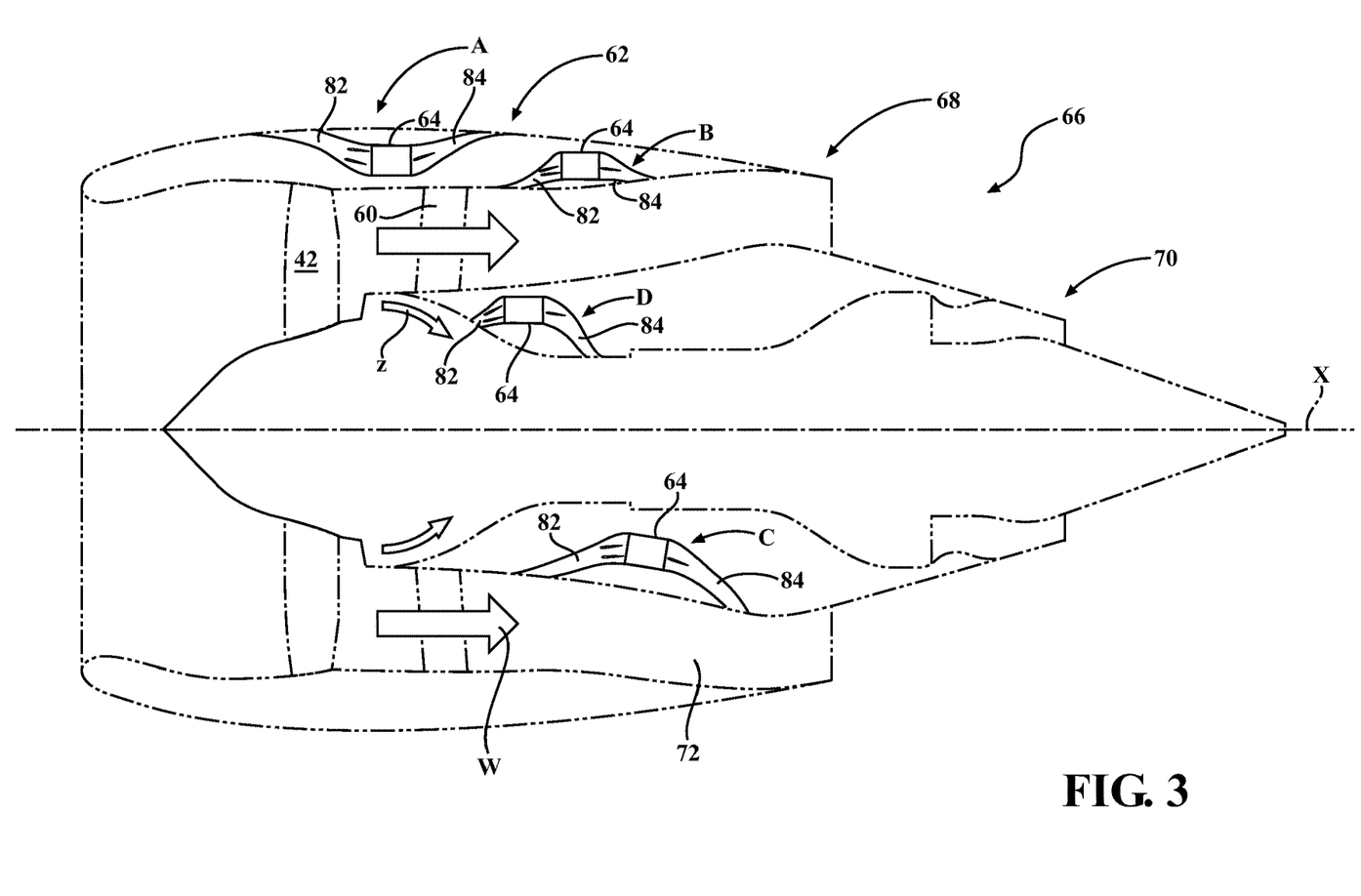
FIG. 3 is a schematic view of a nacelle assembly with a multiple of example locations for a ducted heat exchanger system that exchange flows with different air streams.

With reference to FIG. 3, the ducted heat exchanger system 62 positions the heat exchanger 64 between the inlet duct 82 and the exit duct 84 that are each in fluid communication with a different air stream. For example, the heat exchanger 64 may be located within the fan nacelle 68 with the inlet duct 82 in fluid communication with the bypass stream airflow path "W" and the exit duct 84 in fluid communication with the free stream airflow (illustrated schematically as position E). Alternatively, the ducted heat exchanger system 62 may be located within the core nacelle 70, with the inlet duct 82 in fluid communication with the core engine such as a stage of the LPC 44, and the exit duct 84 in fluid communication with the bypass stream airflow (illustrated schematically as position F). It should be appreciated that various positions and flow paths may be alternatively, or additionally, provided. Further, the heat exchanger 64 may be utilized in other environments such as within an aircraft environmental control system.

Figure 4:
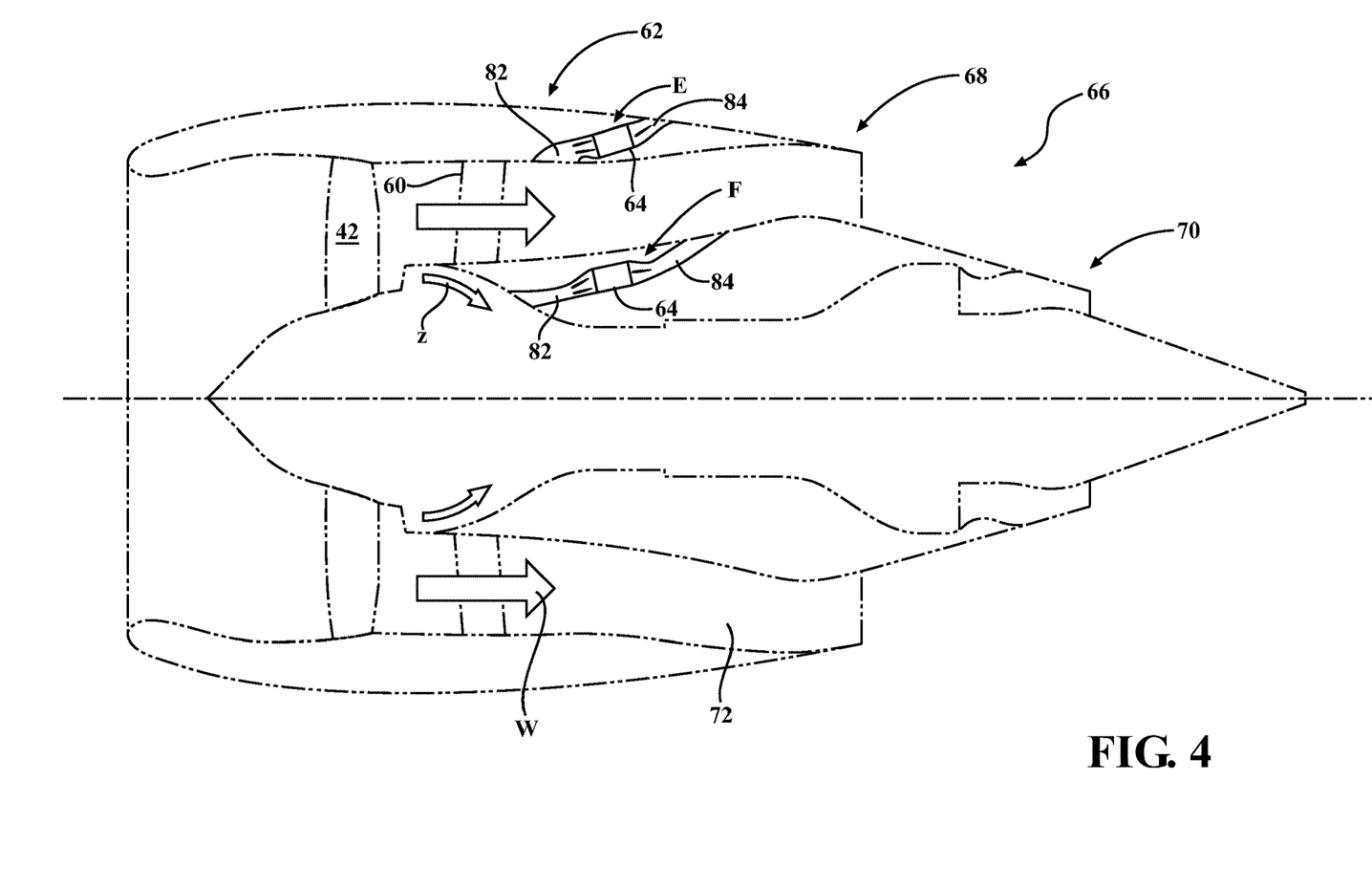
FIG. 4 a schematic cross sectional view of a heat exchanger with an additively manufactured headers according to one disclosed non-limiting embodiment.

With reference to FIG. 4, the heat exchanger 64 in one disclosed non-limiting embodiment generally includes a core 90, a frame 92, a mount arrangement 94, an inlet header 96, and an exit header 98. It should be appreciated that although particular components and/or assemblies are separately defined, each, or any, may be otherwise combined or segregated.

The core 90, the frame 92, the mount arrangement 94, the inlet header 96, and the exit header 98 may be individually or collectively manufactured with an additive manufacturing process that includes, but is not limited to, Direct Metal Laser Sintering (DMLS), Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD) and Laser Powder Bed Fusion (LPBF). The additive manufacturing process sequentially builds-up layers of atomized alloy and/or ceramic powder material that include but are not limited to, 625 Alloy, 718 Alloy, 230 Alloy, stainless steel, tool steel, cobalt chrome, titanium, nickel, aluminum and others in atomized powder material form. Alloys such as 625, 718 and 230 may have specific benefit for parts that operate in high temperature environments, such as, for example, environments typically encountered by aerospace and gas turbine engine components.

The additive manufacturing process facilitates manufacture of the relatively complex geometry to minimize assembly details and multi-component construction. The additive manufacturing process fabricates or "grows" of components using three-dimensional information, for example a three-dimensional computer model. The three-dimensional information is converted into a plurality of slices, each slice defining a cross section of the component for a predetermined height of the slice. The additive manufactured component is then "grown" slice-by-slice, or layer-by-layer. Although particular additive manufacturing processes are disclosed, it should be appreciated that any other suitable rapid manufacturing methods using layer-by-layer construction may alternatively be used.

With continued reference to FIG. 4, the core 90 is located between the inlet header 96 and the exit header 98 which respectively communicate with the inlet duct 82 and the exit duct 84 to form a complete duct 100 of the ducted heat exchanger system 62 to continuously or selectively receive airflow. The inlet header 96 and the exit header 98 may be of various shapes, lengths, and configurations, such that the airflow may have particular flow characteristics to the respective inlet header 96, and from the exit header 98. In other words, due at least in part to the packaging constraints within the fan nacelle 68 or core nacelle 70, the airflow into the inlet header 96 and from the exit header 98 may not be optimized.

The core 90, as defined herein, may be considered a plate-fin, a shell-tube, or other air-air, or air-fluid passage internal geometry, while the frame 92 is the outer structure that supports the internal geometry. The mount arrangement 94 may be formed, or at least partially formed, by the frame 92 to support the heat exchanger 64 between the inlet duct 82 and the exit duct 84 which are typically formed into the nacelle assembly 66.

Manufacture via additive manufacturing facilitates continuous variation in the contour geometry of, and within, the inlet header 96, and/or the exit header 98. The inlet header 96, and/or the exit header 98 are thereby readily shaped with respect to the airflow and packaging space provided for the inlet duct 82 and the exit duct 84. For example, the inlet header 96, and/or the exit header 98 need not be symmetrical. That is, the inlet header 96, and/or the exit header 98 are shaped with respect to any non-uniform flow distributions of the airflow through the inlet header 96 and/or the exit header 98 as compared to conventional symmetrical headers that are not shaped with respect to the inlet duct 82 and the exit duct 84.

Figure 5:
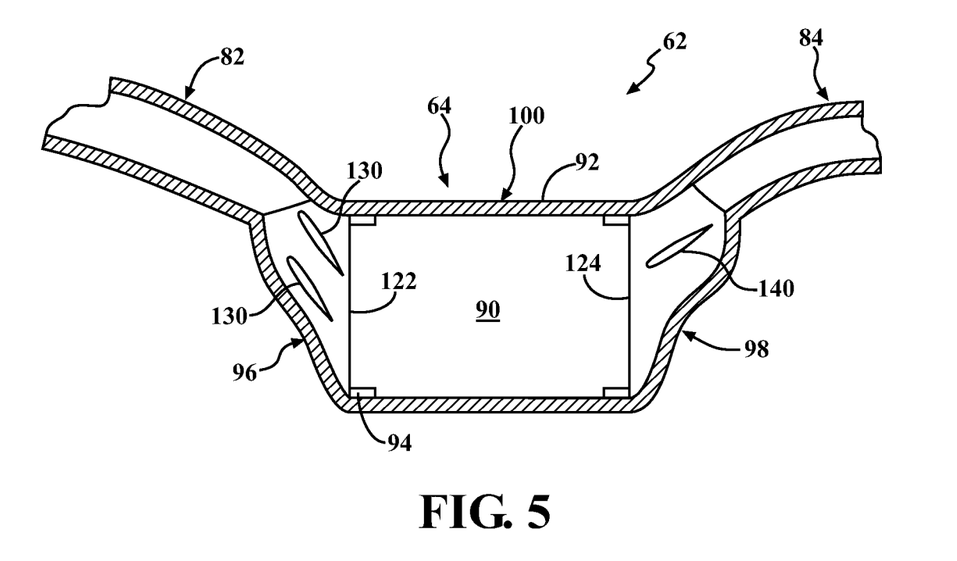
FIG. 5 is a cross-sectional view of the heat exchanger with an additively manufactured headers according to one disclosed non-limiting embodiment.
Figure 6:
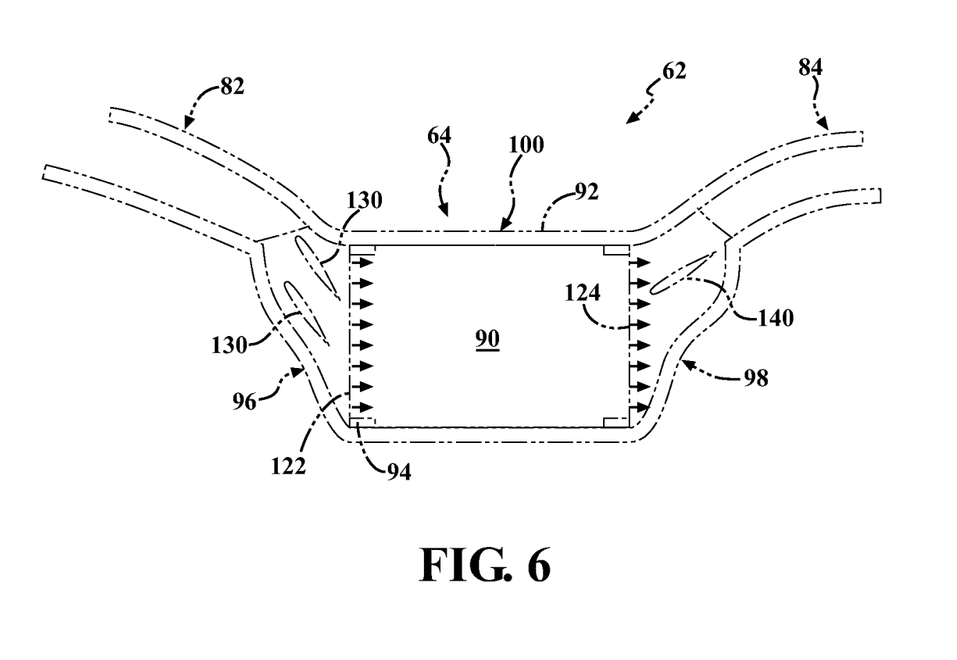
FIG. 6 is a cross-sectional view of the heat exchanger of FIG. 5 illustrating a consistent airflow to and from the core of the heat exchanger system due to the contoured additively manufactured headers.

The contoured geometry of the inlet header 96, and/or the exit header 98 may be determined via Computational Flow Dynamics (CFD) that may, for example, be utilized to set a ratio of local surface area to flow area to control the pressure drop per unit length. The contoured geometry may also be defined such that the airflow is generally perpendicular to the airflow that is to enter (illustrated schematically by arrows 150; FIG. 6) and exit (illustrated schematically by arrows 160; FIG. 6) the core 90 over the entirety of a respective front face 122 and/or a rear face 124 of the core 90 (FIG. 5). That is, the core 90 may be a conventional brick type core with an additively manufactured inlet header 96 and/or exit header 98 that operate to smooth the airflow 150 from the inlet duct 82 into the core 90 and smooth the airflow 160 from the core 90 into the exit duct 84. The inlet header 96 and/or the exit header 98, may be additively manufactured in accords with an optimized design integration process such as, for example, CFD models to provide ideal, low-loss aerodynamic headers that decrease the overall size and weight of the ducted heat exchanger system 62. Alternatively, or in addition, the inlet header 96 and/or the exit header 98, may be additively manufactured to mitigate thermal stresses that may occur in the heat exchanger.

Such a contoured geometry of the additively manufactured inlet header 96 and/or exit header 98 facilitates the equalization of the flow pressure of the airflows 150, 160 to minimize pressure loss. In one example, the contoured geometry of the additively manufactured inlet header 96 and/or exit header 98 permits a reduction in a volume of the core 90 by about 15-20% as compared to an equivalent thermal capacity brick shaped heat exchanger with conventional symmetrical headers.

In another disclosed non-limiting embodiment, to further minimize flow misdistribution or to direct flow towards or away from certain areas to minimize thermal stresses a multiple of additively manufactured internal splitters 130, 140 may be located within the respective inlet header 96, and/or the exit header 98. The internal splitters 130, 140, being additively manufactured, are readily shaped to minimize the flow distribution or direct the flow where desired and facilitate the flow through the core 90.

Reduced pressure losses allow the overall ducted heat exchanger system 62 size to be decreased to facilitate, for example, ideal nacelle aero curves. Cost reductions may also be realized due to the reduced system size.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed:

1. A ducted heat exchanger system, comprising:
an inlet duct with an inlet to a nacelle;
an exit duct with an exit from the nacelle;
a parallelepiped-shaped heat exchanger core comprising an inlet face opposite an exit face;
an additively manufactured inlet header downstream of, and in fluid communication with, the inlet duct, the additively manufactured inlet header upstream of, and in fluid communication with, the heat exchanger core, the additively manufactured inlet header shaped during additive manufacturing based on computational flow dynamics modeling such that during operation the pressure drop per unit length of the additively manufactured inlet header is controlled by maintaining airflow that enters the heat exchanger core generally perpendicular to the inlet face over the entirety of the inlet face of the heat exchanger core;
a multiple of additively manufactured internal splitters within the additively manufactured inlet header; and
an additively manufactured exit header upstream of, and in fluid communication with, the exit duct, the additively manufactured exit header downstream of, and in fluid communication with, the heat exchanger core, the additively manufactured exit header shaped during additive manufacturing based on computational flow dynamics modeling such that during operation the pressure drop per unit length of the additively manufactured exit header is controlled by maintaining airflow that enters the heat exchanger core is generally perpendicular to the exit face over the entirety of the exit face of the heat exchanger core.

2. The ducted heat exchanger system as recited in claim 1, wherein at least one of the additively manufactured inlet header and exit header defines a continuous variation of a cross-sectional area during manufacture to maintain the airflow that enters and exits the heat exchanger core generally perpendicular to the inlet face and the exit face during operation.

3. The ducted heat exchanger system as recited in claim 1, wherein the inlet and exit additively manufactured header are further shaped to provide a non-uniform velocity along a flowpath thereof during operation to minimize thermal stresses by maintaining the airflow that enters the heat exchanger core generally perpendicular.

4. The ducted heat exchanger system as recited in claim 1, wherein the heat exchanger core provides an about 15% to about 20% reduction in volume as compared to an equivalent thermal capacity parallelepiped-shaped heat exchanger core due to the additively manufactured inlet header and the additively manufactured exit header.

5. The ducted heat exchanger system as recited in claim 1, wherein the additively manufactured header is shaped during manufacture to provide a non-uniform velocity to minimize thermal stresses during operation.

6. The ducted heat exchanger system as recited in claim 1, wherein the additively manufactured inlet header and the additively manufactured exit header are shaped during manufacture to respectively provide a uniform velocity of airflow into and from the core during operation.

7. The system as recited in claim 1, wherein an air stream that enters into the additively manufactured inlet header during operation is a free stream.

8. The system as recited in claim 1, wherein the nacelle is a fan nacelle.

9. The system as recited in claim 1, wherein an air stream that enters into the additively manufactured inlet header during operation is a bypass stream.

10. The system as recited in claim 1, wherein the nacelle is a core nacelle.

11. The system as recited in claim 1, wherein the additively manufactured inlet header and the additively manufactured exit header are both in fluid communication with the same an air stream during operation.

12. The system as recited in claim 1, wherein the additively manufactured inlet header and the additively manufactured exit header are each shaped during manufacture to provide a non-symmetrical continuous variation in cross-sectional area along the flow area of the additively manufactured inlet header and the additively manufactured exit header.

* * * * *